United States Patent
Yu et al.

(10) Patent No.: US 12,508,965 B2
(45) Date of Patent: Dec. 30, 2025

(54) DEVICE FOR ADJUSTING POSITION OF VEHICLE HEADREST

(71) Applicants: Kia Corporation, Seoul (KR); Hyundai Motor Company, Seoul (KR); SEOYONCNF, Ulsan (KR); HYUNDAI TRANSYS INC., Seosan-si (KR)

(72) Inventors: Sang Uk Yu, Seoul (KR); Sang Ho Kim, Incheon (KR); Seung Young Lee, Seoul (KR); Tae Hoon Lee, Suwon-si (KR); Jun Namgoong, Asan-si (KR); Yong Jun Shin, Ulsan (KR); Won Kee Kim, Hwaseong-si (KR); Hyun Kim, Hwaseong-si (KR); Jun Ho Lee, Yongin-si (KR)

(73) Assignees: Hyundai Motor Company, Seoul (KR); Kia Corporation, Seoul (KR); Hyundai Transys Inc., Seosan-si (KR); SEOYONCNF, Ulsan (KR)

( * ) Notice: Subject to any disclaimer, the term of this patent is extended or adjusted under 35 U.S.C. 154(b) by 160 days.

(21) Appl. No.: 18/613,058

(22) Filed: Mar. 21, 2024

(65) Prior Publication Data
US 2025/0170937 A1 May 29, 2025

(30) Foreign Application Priority Data
Nov. 28, 2023 (KR) ......................... 10-2023-0168118

(51) Int. Cl.
*B60N 2/806* (2018.01)
*B60N 2/809* (2018.01)
(Continued)

(52) U.S. Cl.
CPC ............. *B60N 2/829* (2018.02); *B60N 2/809* (2018.02); *B60N 2/821* (2018.02); *B60N 2/862* (2018.02); *B60N 2/865* (2018.02); *B60N 2/806* (2018.02)

(58) Field of Classification Search
CPC ........ B60N 2/806; B60N 2/809; B60N 2/821; B60N 2/829; B60N 2/862; B60N 2/865
See application file for complete search history.

(56) References Cited

U.S. PATENT DOCUMENTS

| | | | |
|---|---|---|---|
| 6,511,130 B2 * | 1/2003 | Dinkel | B60N 2/853 297/410 |
| 7,070,235 B2 * | 7/2006 | Schilling | B60N 2/865 297/216.12 |

(Continued)

FOREIGN PATENT DOCUMENTS

| | | | | |
|---|---|---|---|---|
| DE | 102017108790 A1 * | 11/2017 | ............. | B60N 2/865 |
| DE | 102022120969 A1 * | 2/2024 | ............. | B60N 2/865 |

(Continued)

*Primary Examiner* — Rodney B White
(74) *Attorney, Agent, or Firm* — Slater Matsil, LLP

(57) ABSTRACT

In an embodiment a headrest position adjustment system includes a housing mounted on a front surface portion of a high-back board, a headrest mounted on the housing, the headrest being capable of moving forward and backward, a fixing frame comprising slide holes in opposite side portions of the fixing frame, the fixing frame being mounted inside the housing, a first motor mounted on the fixing frame, the first motor having a first lead screw facing forward as an output shaft, and a side bracket disposed on each of the opposite side portions of the fixing frame and connected to the headrest, the side bracket being fastened to a slide hole such that the side bracket is capable of being moved forward and backward.

20 Claims, 8 Drawing Sheets

(51) Int. Cl.
  *B60N 2/821*  (2018.01)
  *B60N 2/829*  (2018.01)
  *B60N 2/862*  (2018.01)
  *B60N 2/865*  (2018.01)

(56) References Cited

U.S. PATENT DOCUMENTS

| | | | | |
|---|---|---|---|---|
| 7,073,856 | B2 * | 7/2006 | Akaike | B60N 2/832 |
| | | | | 297/216.12 |
| 7,350,859 | B2 * | 4/2008 | Klukowski | B60N 2/888 |
| | | | | 297/216.12 |
| 7,500,721 | B2 * | 3/2009 | Beroth | B64D 11/0642 |
| | | | | 297/410 |
| 7,517,015 | B2 * | 4/2009 | Terada | B60N 2/888 |
| | | | | 297/216.12 |
| 7,520,564 | B2 * | 4/2009 | Woerner | B60N 2/888 |
| | | | | 297/216.12 |
| 7,611,196 | B2 * | 11/2009 | Terada | B60N 2/888 |
| | | | | 297/216.12 |
| 7,618,091 | B2 * | 11/2009 | Akaike | B60N 2/888 |
| | | | | 297/216.12 |
| 7,717,507 | B2 * | 5/2010 | Toda | B60N 2/862 |
| | | | | 297/216.12 |
| 7,770,967 | B2 * | 8/2010 | Hirota | B60N 2/862 |
| | | | | 297/216.12 |
| 7,963,598 | B2 * | 6/2011 | Akaike | B60N 2/0028 |
| | | | | 297/216.12 |
| 8,038,219 | B2 * | 10/2011 | Boes | B60N 2/815 |
| | | | | 297/410 |
| 8,600,626 | B2 * | 12/2013 | Yamaguchi | B60N 2/829 |
| | | | | 297/216.12 |
| 8,616,633 | B2 * | 12/2013 | Truckenbrodt | B60N 2/865 |
| | | | | 297/216.12 |
| 8,632,125 | B2 * | 1/2014 | Yamaguchi | B60N 2/0273 |
| | | | | 297/216.12 |
| 8,833,851 | B2 * | 9/2014 | Corral Rodriguez | B60N 2/888 |
| | | | | 297/216.12 |
| 8,899,685 | B2 * | 12/2014 | Haeske | B60N 2/42727 |
| | | | | 297/410 |
| 9,096,154 | B2 * | 8/2015 | Kwon | B60N 2/2209 |
| 9,446,695 | B2 * | 9/2016 | Ishihara | B60N 2/862 |
| 9,718,381 | B2 * | 8/2017 | Yoo | B60N 2/806 |
| 9,789,795 | B2 * | 10/2017 | Ishihara | B60N 2/862 |
| 9,878,645 | B2 * | 1/2018 | Kim | B60N 2/865 |
| 9,987,958 | B2 * | 6/2018 | Kondrad | B60N 2/865 |
| 10,160,361 | B2 * | 12/2018 | Little | B60N 2/02246 |
| 10,266,089 | B2 * | 4/2019 | Tatewaki | B60N 2/865 |
| 10,315,546 | B2 * | 6/2019 | An | B60N 2/85 |
| 10,449,881 | B2 * | 10/2019 | Ishihara | B60N 2/865 |
| 10,500,997 | B2 * | 12/2019 | Maloney | B60N 2/829 |
| 10,589,650 | B2 * | 3/2020 | Nakamura | B60N 2/853 |
| 10,703,242 | B2 * | 7/2020 | Spackman | B60N 2/847 |
| 10,821,866 | B2 * | 11/2020 | Nuss | B60N 2/943 |
| 12,059,989 | B2 * | 8/2024 | Schukalski | B60N 2/02246 |
| 12,071,055 | B2 * | 8/2024 | Kim | B60N 2/02253 |
| 12,162,390 | B2 * | 12/2024 | Yu | B60N 2/853 |
| 12,202,393 | B2 * | 1/2025 | Yu | B60N 2/865 |
| 2004/0262974 | A1 * | 12/2004 | Terada | B60N 2/865 |
| | | | | 297/407 |
| 2006/0175881 | A1 * | 8/2006 | Akaike | B60N 2/85 |
| | | | | 297/216.12 |
| 2007/0246989 | A1 * | 10/2007 | Brockman | B60N 2/865 |
| | | | | 297/216.12 |
| 2011/0233974 | A1 * | 9/2011 | Yamaguchi | B60N 2/0276 |
| | | | | 297/216.12 |
| 2016/0129816 | A1 * | 5/2016 | Lee | B60N 2/853 |
| | | | | 297/409 |
| 2017/0341546 | A1 * | 11/2017 | Tatewaki | B60N 2/865 |
| 2022/0118897 | A1 * | 4/2022 | Lee | B60N 2/809 |
| 2023/0137430 | A1 | 5/2023 | Schukalski | |
| 2024/0075861 | A1 * | 3/2024 | Xiao | B60N 2/02253 |
| 2025/0065790 | A1 * | 2/2025 | Yu | B60N 2/865 |
| 2025/0145070 | A1 * | 5/2025 | Jeong | B60N 2/02258 |

FOREIGN PATENT DOCUMENTS

| | | | |
|---|---|---|---|
| KR | 20220146648 A | 11/2022 | |
| WO | WO-2004039626 A1 * | 5/2004 | B60N 2/888 |

* cited by examiner

DEVICE FOR ADJUSTING POSITION OF VEHICLE HEADREST

CROSS-REFERENCE TO RELATED APPLICATIONS

The present application claims priority to Korean Patent Application No. 10-2023-0168118, filed Nov. 28, 2023, the entire contents of which are incorporated herein for all purposes by this reference.

TECHNICAL FIELD

The present disclosure relates to a headrest position adjustment apparatus for a vehicle. More particularly, the present disclosure relates to a headrest position adjustment apparatus for a vehicle, the apparatus being configured such that a position of a headrest in front and rear directions and up and down directions is capable of being conveniently adjusted, the headrest being mounted on a high-back board of a seatback.

BACKGROUND

Generally, a seat for a vehicle includes a seat cushion that supports the lower body of a passenger, a seatback that supports the back and the waist of the passenger, a headrest that supports the neck and the head portion of the passenger, and so on.

When the occipital region is not fully supported on the headrest according to the physical condition of the passenger, there are problems that the passenger feels discomfort and a risk of injury in a collision accident may be increased.

In order to solve the problems, various forward-backward driving mechanisms for adjusting front and rear positions of the headrest and various vertical driving mechanisms for adjusting up and down positions of the headrest according to the position of the passenger's head are applied.

The forward-backward driving mechanism and the vertical driving mechanism of the headrest are required to be designed and manufactured in consideration of the seat design of the vehicle.

For example, in the configuration of the vehicle seat, a high-back board that is arranged higher than a height of the seatback is mounted on a rear surface portion of the seatback so as to increase aesthetic appearance of the seat and so on, and the headrest may be mounted on a front surface portion of the high-back board.

SUMMARY

Embodiments provide a headrest position adjustment apparatus for a vehicle, the apparatus having a new type of forward and backward driving mechanism for adjusting a forward and backward position of a headrest and a new type of upward and downward driving mechanism for adjusting an upward and downward position of the headrest that are mounted across the headrest mounted on a front surface portion of a high-back board and across the high-back board mounted on a rear surface portion of a seatback such that the high-back board is arranged higher than a height of the seatback, thereby being capable of conveniently adjusting the forward and backward position and the upward and downward position of the headrest mounted on the high-back board.

Various embodiments provide a headrest position adjustment apparatus for a vehicle, the headrest position adjustment apparatus including a housing mounted on a front surface portion of a high-back board, a headrest mounted on the housing such that the headrest is capable of being slidably moved forward and backward, a fixing frame having a structure in which a slide hole is formed in opposite side portions of the fixing frame, the fixing frame being mounted inside the housing, a first motor mounted on the fixing frame, the first motor having a first lead screw facing forward as an output shaft, a side bracket disposed on each of the opposite side portions of the fixing frame and connected to the headrest, the side bracket being fastened to the slide hole such that the side bracket is capable of being moved forward and backward, a front link having a lower end portion of opposite sides thereof hinge-fastened to the fixing bracket, the front link having an upper end portion of the opposite sides thereof fastened to each front end portion of the side bracket such that the front link is capable of being rotated forward and backward, a rear link having a lower end portion of opposite sides thereof hinge-fastened to the fixing bracket, the rear link having an upper end portion of the opposite sides thereof fastened to each rear end portion of the side bracket such that the rear link is capable of being rotated forward and backward, and a slider fastened to the first lead screw such that the slider is capable of being moved forward and backward, the slider having a front end portion connected to the front link.

A push-pull plate connected to the headrest may be bent and may be formed as an integral part of each front end portion of the side bracket.

A slide pin inserted into the slide hole of the fixing frame such that the slide pin is capable of being moved forward and backward may be fastened to a lower position of each rear end portion of the side bracket.

A first slot into which a front pin fastened to the upper end portion of the opposite sides of the front link is inserted such that the front pin is capable of being moved upward and downward and a second slot into which a rear pin fastened to the upper end portion of the opposite sides of the rear link is inserted such that the rear pin is capable of being moved upward and downward may be respectively formed on an upper position of the front end portion and an upper position of the rear end portion of the side bracket.

A link connector may be further disposed on opposite side portions of the side bracket such that the front pin passing through the first slot and the rear pin passing through the second slot are capable of being prevented from being separated.

A lower pin may be inserted into and fastened to a lower portion of each link connector, and a third slot into which the lower pin is inserted such that the lower pin is capable of being moved upward and downward may be formed on a lower position of the front end portion of each side bracket.

A passage hole that is a passage for the slider to be moved forward and backward along the first lead screw may be formed in the front link and the rear link.

Preferably, the slider may include a body portion having an arm screw that is fastened to the first lead screw such that the arm screw is capable of being moved forward and backward, and may include a guide pin formed on opposite side portions of the body portion and fastened to the front link such that the guide pin is capable of being moved upward and downward.

In addition, a guide groove where the guide pin of the slider is inserted thereinto and fastened thereto may be formed in each opposite side portion of the front link such that the guide pin is capable of being moved upward and downward.

A connection bracket connected to a headrest height adjustment apparatus that is mounted inside the high-back board may be mounted on a rear surface portion of a vertical plate of the fixing frame.

The headrest height adjustment apparatus may include: an upper bracket and a lower bracket mounted inside the high-back board; a pair of guide pipes connected between the upper bracket and the lower bracket; a lifting plate fastened to the connection bracket and also fastened to the guide pipes such that the lifting plate is capable of being lifted; and a second motor mounted on the lower bracket so as to drive the lifting plate.

In addition, an arm screw body may be formed on a rear surface portion of the lifting plate, and a second lead screw fastened to the arm screw body may be mounted on an output portion of the second motor such that the second lead screw faces upward.

According to the above configurations, the present disclosure may have the following effects:

First, since the electric forward and backward driving mechanism for adjusting the forward and backward position of the headrest is mounted across the high-back board mounted on the rear surface portion of the seatback and across the inside of the housing mounted on the front surface portion of the high-back board, the forward and backward adjustment of the position of the headrest is capable of being conveniently performed even if the high-back board that is arranged higher than the height of the seatback is mounted on the rear surface portion of the seatback.

Second, since the electric upward and downward driving mechanism for adjusting the upward and downward position of the headrest is mounted inside the high-back board, the upward and downward adjustment of the position of the headrest is capable of being conveniently performed even if the high-back board that is arranged higher than the height of the seatback is mounted on the rear surface portion of the seatback.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Figure 1:
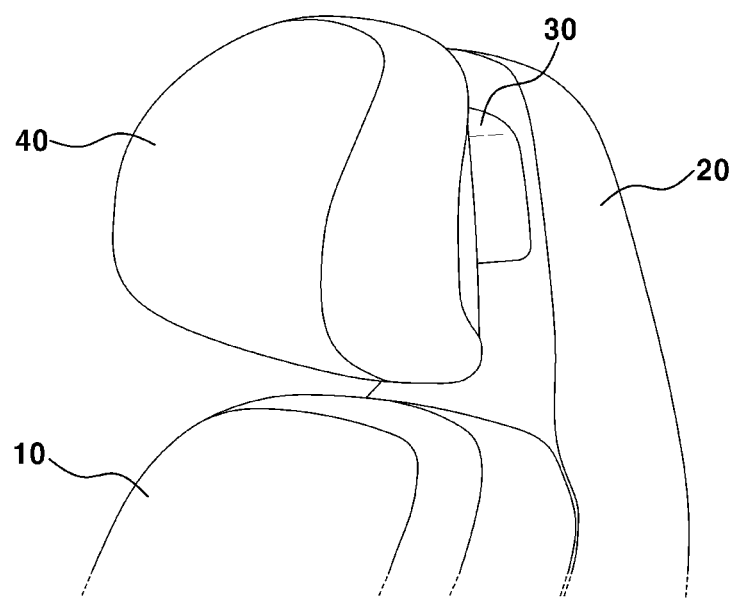
FIG. 1 is a view schematically illustrating a high-back board and a headrest in which a headrest position adjustment apparatus for a vehicle according to the present disclosure is mounted.

Specific structures and functions stated in the embodiment of the present disclosure are exemplified to illustrate an embodiment according to the spirit of the present disclosure and embodiments according to the spirit of the present disclosure can be achieved in various ways. In addition, the present disclosure should not be construed as being limited to the following embodiments and should be construed as including all changes, equivalents, and replacements included in the spirit and scope of the present disclosure.

In the present disclosure, terms including "first" and/or "second" may be used to describe various components, but the components are not limited to the terms. The terms are used to distinguish one component from another component, and for instance, a first component may be referred to as a second component, and similarly, a second component may be referred to as a first component without departing from the scope according to the spirit of the present disclosure.

In the present disclosure, when a component is referred to as being "connected" or "coupled" to another component, it should be understood that it may be directly connected or coupled to the other component, but other components may exist therebetween. On the other hand, when a component is referred to as being "directly connected" or "directly contacted" to another component, it should be understood that there is no other component therebetween. Expressions for describing relationships between components, that is, "between", "directly between", "adjacent to", and "directly adjacent to" should be construed in the same way.

Like components will be denoted by like reference numerals throughout the specification. Terms used in the specification are used to describe embodiments of the present disclosure and are not intended to limit the scope of the present disclosure. In the specification, the terms of a singular form may include plural forms unless otherwise specified. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, an exemplary embodiment of the present disclosure will be described with reference to accompanying drawings.

Referring to FIG. 1, in configurations of a vehicle seat, a high-back board 20 that is arranged on a rear surface portion of a seatback 10 such that the high-back board 20 is positioned higher than a height of the seatback 10 is mounted for increasing aesthetic appearance and so on, a housing 30 is mounted on a front surface portion of the high-back board 20, and a headrest 40 is mounted on the housing 30 such that the headrest 40 is capable of being slid forward and backward.

In the present disclosure, an electric forward and backward position adjustment apparatus capable of moving the headrest 40 along front and rear directions and an electric height adjustment apparatus capable of moving the headrest 40 along up and down directions are mounted inside the housing 30 and the headrest 40, so that a position of the headrest 40 is capable of being conveniently adjusted from the high-back board 20 along the front and rear directions and the up and down directions.

Figure 2:
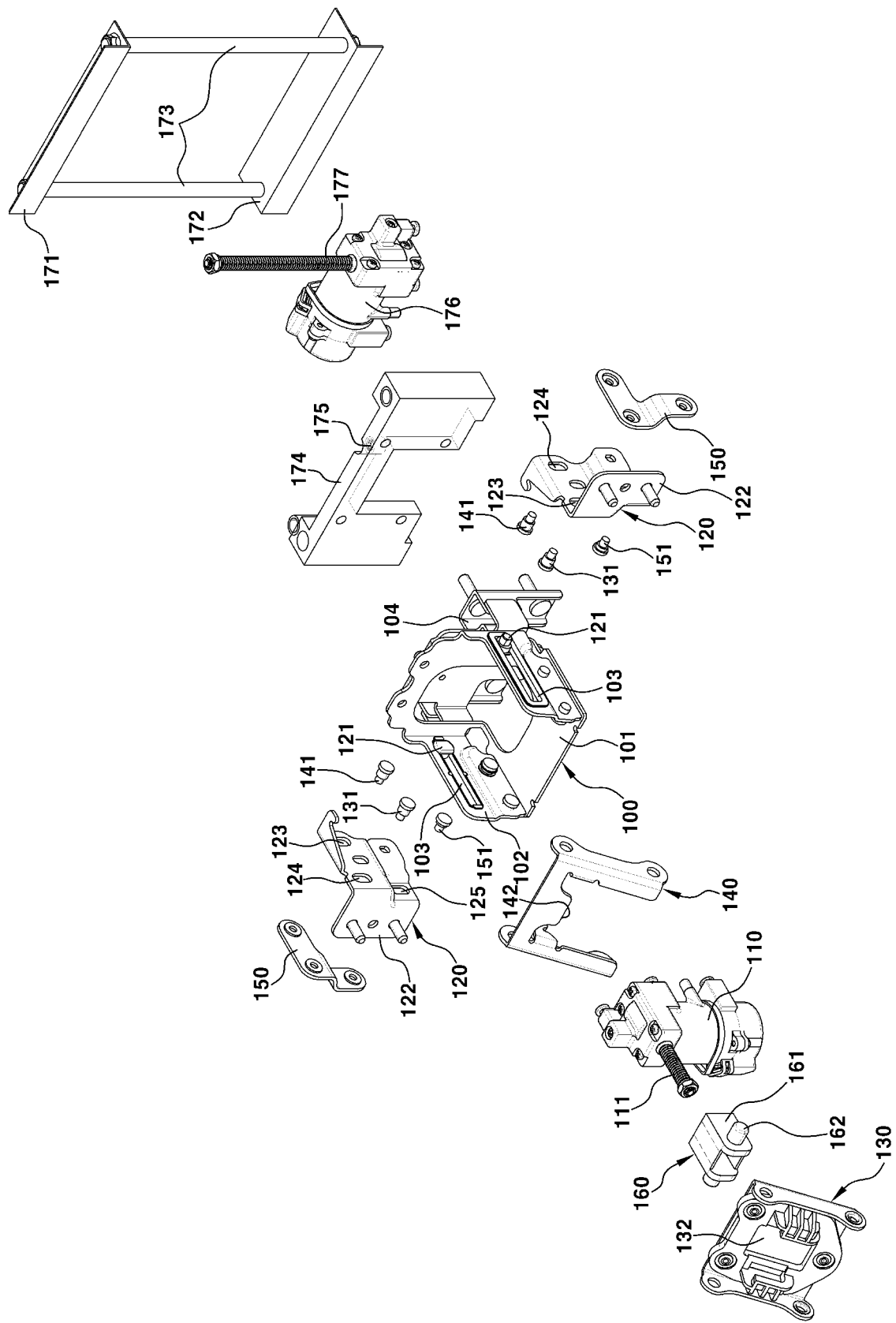
FIG. 2 is an exploded perspective view illustrating the headrest position adjustment apparatus for the vehicle according to the present disclosure.
Figure 3:
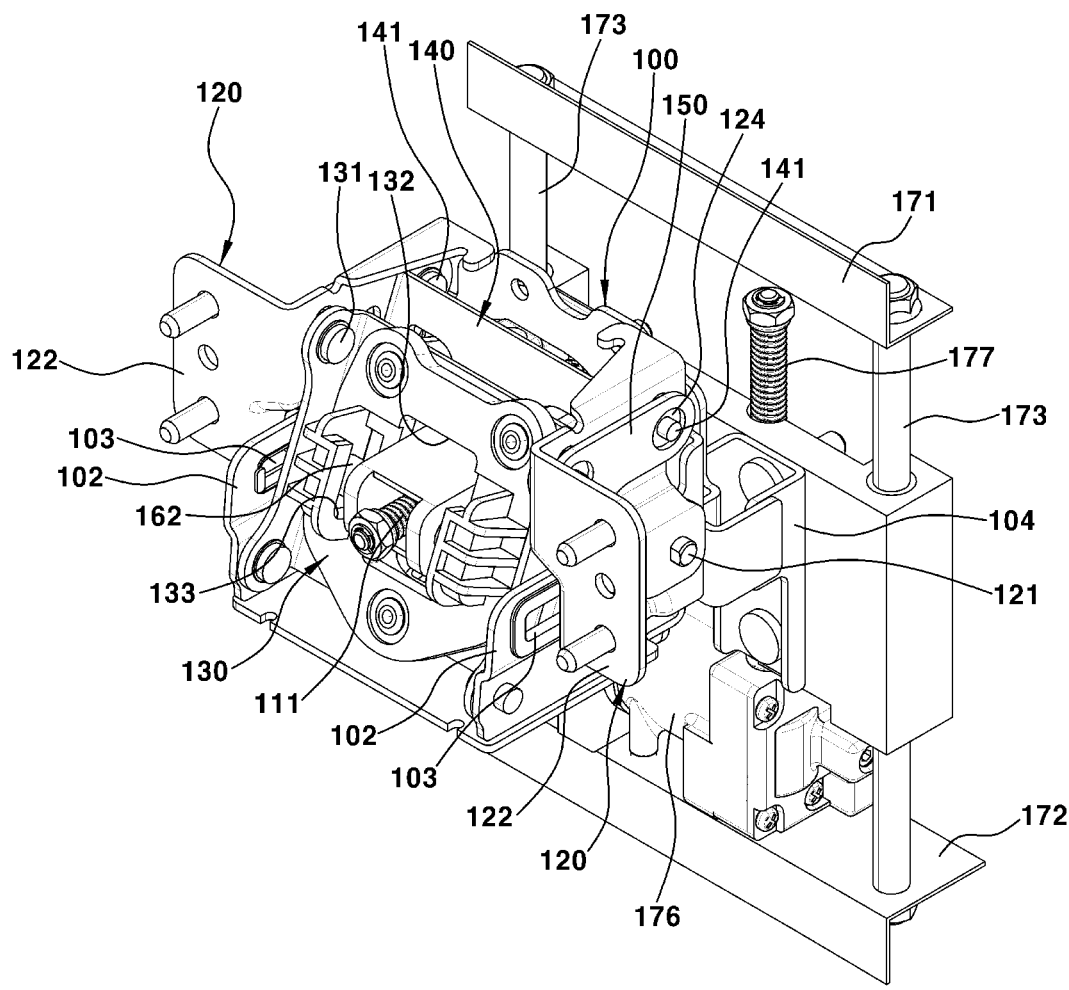
FIG. 3 is an assembled perspective view illustrating the headrest position adjustment apparatus for the vehicle according to the present disclosure.

FIG. 2 is an exploded perspective view illustrating a headrest position adjustment apparatus for a vehicle according to the present disclosure, and FIG. 3 is an assembled perspective view illustrating the headrest position adjustment apparatus for the vehicle according to the present disclosure.

A fixing frame 100 is mounted inside the housing 30 that is mounted on the front surface portion of the high-back board 20.

The fixing frame 100 includes a vertical plate 101 fastened to a predetermined position inside the housing 30 and includes a side plate 102 formed integrally on opposite sides of the vertical plate 101, and a slide hole 103 having a long rectilinear shape in the front and rear directions is formed on each side plate 102.

A first motor 110 having a first lead screw 111 as an output shaft is mounted on the vertical plate 101 of the fixing frame 100, and the first lead screw 111 is arranged such that the first lead screw 111 faces forward.

Accordingly, when the first motor 110 is driven, the first lead screw 111 is rotated in place in a first direction or a second direction.

A side bracket 120 is disposed on each side portion of the fixing frame 100, and the side bracket 120 is mounted on the slide hole 103 such that the side bracket 120 is capable of being moved forward and backward.

More specifically, a slide pin 121 inserted into the slide hole 103 of the fixing frame 100 such that the slide pin 121 is capable of being moved forward and backward along the slide hole 103 is fastened to a lower position of a rear end portion of the side bracket 120, the side bracket 120 is capable of being moved in the front and rear directions when the slide pin 121 is moved in the front and rear directions along the slide hole 103.

At this time, a push-pull plate 122 connected to an inner frame 42 of the headrest 40 is formed on a front end portion of the side bracket 120 such that the push-pull plate 122 is bent outward.

Accordingly, when the side bracket 120 is moved forward, the push-pull plate 122 pushes the headrest 40 forward. Furthermore, when the side bracket 120 is moved backward, the push-pull plate 122 pulls the headrest 40 backward.

A front link 130 and a rear link 140 that are configured to move the side bracket 120 forward or backward when the first lead screw 111 is rotated in place are connected between the fixing bracket 100 and the side bracket 120.

To this end, lower end portions of opposite sides of the front link 130 are hinge-fastened to a lower position of the side plate 102 of the fixing bracket 100, and upper end portions of the opposite sides of the front link 130 are fastened to an upper position of the front end portion of the side bracket 120 such that the front link 130 is capable of being rotated forward and backward.

In addition, lower end portions of opposite sides of the rear link 140 are hinge-fastened to the lower position of the side plate 102 of the fixing bracket 100, and upper end portions of the opposite sides of the rear link 140 are fastened to an upper position of the rear end portion of the side bracket 120 such that the rear link 140 is capable of being rotated forward and backward.

Particularly, a first slot 123 formed long in the up and down directions such that a front pin 131 fastened to the upper end portions of the opposite sides of the front link 130 is capable of being moved in the up and down directions is formed on the upper position of the front end portion of the side bracket 120, and a second slot 124 formed long in the up and down directions such that a rear pin 141 fastened to the upper end portions of the rear link 140 is capable of being moved in the up and down directions is formed on the upper position of the rear end portion of the side bracket 120.

Therefore, when the upper end portion of the front link 130 is rotated forward or backward around hinge-fastening points (points where the lower end portions of the opposite sides of the front link 130 are hinge-fastened to the lower position of the side plate 102 of the fixing bracket 100), each front pin 131 fastened to each upper end portion of the opposite sides of the front link 130 may sway in the first slot 123 of the side bracket 120 in the up and down directions, so that the upper end portion of the front link 130 may be easily rotated forward or backward.

At the same time, when the upper end portion of the rear link 140 is rotated forward or backward around hinge-fastening points (points where the lower end portions of the opposite sides of the rear link 140 are hinge-fastened to the lower position of the side plate 102 of the fixing bracket 100), each rear pin 141 fastened to each upper end portion of the opposite sides of the rear link 140 may sway in the second slot 124 of the side bracket 120 in the up and down directions, so that the upper end portion of the rear link 140 may be easily rotated forward or backward.

Therefore, when the upper end portions of the front link 130 and the rear link 140 are rotated forward or backward, the front pin 131 of the front link 130 and the rear pin 141 of the rear link 140 that are respectively inserted into the first slot 123 and the second slot 124 of the side bracket 120 push the side bracket 120 forward or push the side bracket 120 backward, so that the slide pin 121 of the side bracket 120 may be rectilinearly moved forward or backward along the slide hole 103 of the fixing frame 100. Accordingly, the side bracket 120 may be rectilinearly moved forward or backward.

At the same time, when the side bracket 120 is moved forward, the push-pull plate 122 pushes the headrest 40 forward. Furthermore, when the side bracket 120 is moved backward, the push-pull plate 122 pulls the headrest 40 backward. Therefore, the forward and backward position of the headrest 40 may be adjusted.

Meanwhile, a link connector 150 for connecting the front link 130 and the rear link 140 together such that the front link 130 and the rear link 140 are capable of being rotated simultaneously is further disposed on each side portion of each side bracket 120.

To this end, the front pin 131 of the front link 130 passing through the first slot 123 and the rear pin 141 of the rear link 140 passing through the second slot 124 are fastened to the upper portion of each link connector 150 disposed on the opposite side portions of each side bracket 120 such that the front pin 131 and the rear pin 141 are prevented from being separated, so that the front link 130 and the rear link 140 are in a state in which the front link 130 and the rear link 140 are capable of being rotated simultaneously by the link connector 150.

At this time, when the front link 130 and the rear link 140 are rotated forward or backward, the front pin 131 sways in the up and down directions in the first slot 123, and the rear pin 141 sways in the up and down directions in the second slot 124, so that the front link 130 and the rear link 140 are required to be swayed in the up and down direction simultaneously by the link connector 150 to which the front pin 131 and the rear pin 141 are fastened.

To this end, a lower pin 151 is inserted into and fastened to each lower portion of each link connector 150, and a third slot 125 into which the lower pin 151 is inserted such that the lower pin 151 is capable of being moved in the up and down directions are formed on the lower position of the front end portion of each side bracket 120.

Therefore, when the front link 130 and the rear link 140 are rotated forward or backward, the front pin 131 is swayed in the up and down directions in the first slot 123, and the rear pin 141 is swayed in the up and down directions in the second slot 124. At the same time, since the lower pin 151 of the link connector 150 is capable of being swayed in the up and down directions in the third slot 125 of the side bracket 120, the link connector 150 is capable of being swayed in the up and down directions when the front pin 131 and the rear pin 141 are moved in the up and down directions.

Meanwhile, a slider 160 is fastened to the first lead screw 111 such that the slider 160 is capable of being moved forward and backward, and a front end portion of the slider 160 is connected to the front link 130.

To this end, the slider 160 includes a body portion 161 having an arm screw that is fastened to the first lead screw 111 such that the arm screw is capable of being moved forward and backward, and includes a guide pin 162 which protrudes on opposite side portions of the body portion 161 and which is fastened to the front link 130 such that the guide pin 162 is capable of being moved in the up and down directions. Furthermore, a guide groove 133 where each guide pin 162 of the slider 160 is inserted thereinto and fastened thereto such that the guide pin 162 is capable of being moved in the up and down directions is formed on the opposite side portions of the front link 130.

Therefore, when the slider 160 moves forward or backward along the first lead screw 111 and pushes or pulls the front link 130, the front link 130 may be rotated forward or backward. Furthermore, when the front link 130 is rotated, the guide pin 162 of the slider 160 is swayed in the up and down directions in the guide groove 133 of the front link 130, so that the forward and backward rotation of the front link 130 may be smoothly performed.

Preferably, passage holes 132 and 142 that are passages for the slider 160 to be moved forward and backward along the first lead screw 111 are respectively formed through the front link 130 and the rear link 140, so that the slider 160 is capable of being moved forward and backward in the passage holes 132 and 142 without interference when the slider 160 is moved forward and backward along the first lead screw 111.

Meanwhile, a connection bracket 104 for connecting a headrest height adjustment apparatus 170 that is mounted inside the high-back board 20 is mounted on a rear surface portion of the fixing frame 100.

The headrest height adjustment apparatus 170 may include an upper bracket 171 and a lower bracket 172 that are mounted inside the high-back board 20, a pair of guide pipes 173 connected between the upper bracket 171 and the lower bracket 172, a lifting plate 174 which is fastened to the connection bracket 104 and which is fastened to the guide pipes 173 such that the lifting plate 174 is capable of being lifted, and a second motor 176 which is mounted on the lower bracket 172 and which is configured to lift and drive the lifting plate 174.

In addition, an arm screw body 175 is formed on a rear surface portion of the lifting plate 174, and a second lead screw 177 fastened to the arm screw body 175 such that the second lead screw 177 is capable of being rotated in place around the arm screw body 175 and faces upward is mounted on an output portion of the second motor 176.

Here, an operation flow of the headrest position adjustment apparatus of the present disclosure configured as described above is as follows.

Figure 4:
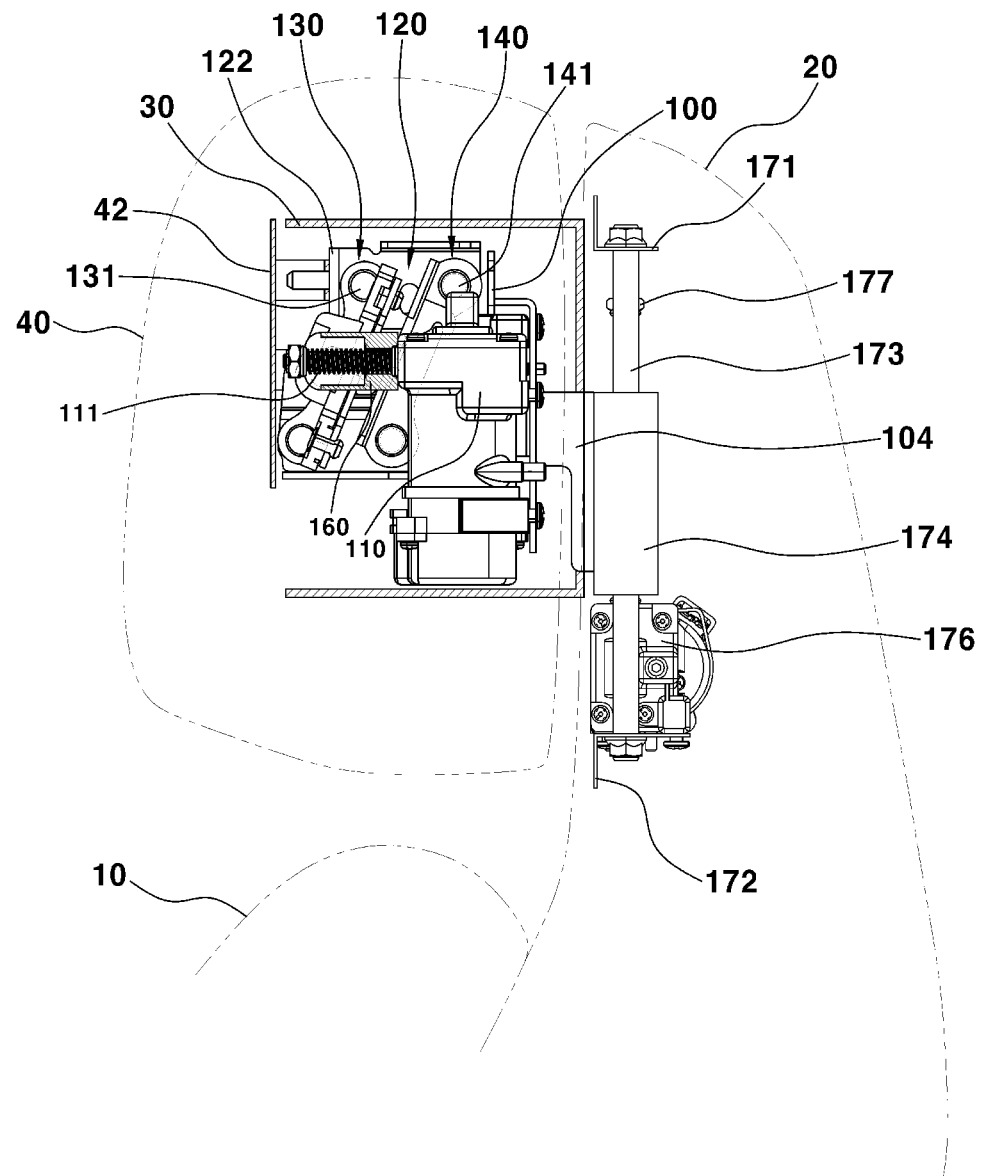
FIG. 4 and FIG. 5 are cross-sectional views illustrating a state in which a headrest is moved backward and is positioned at the rearmost position by the headrest position adjustment apparatus for the vehicle according to the present disclosure.
Figure 5:
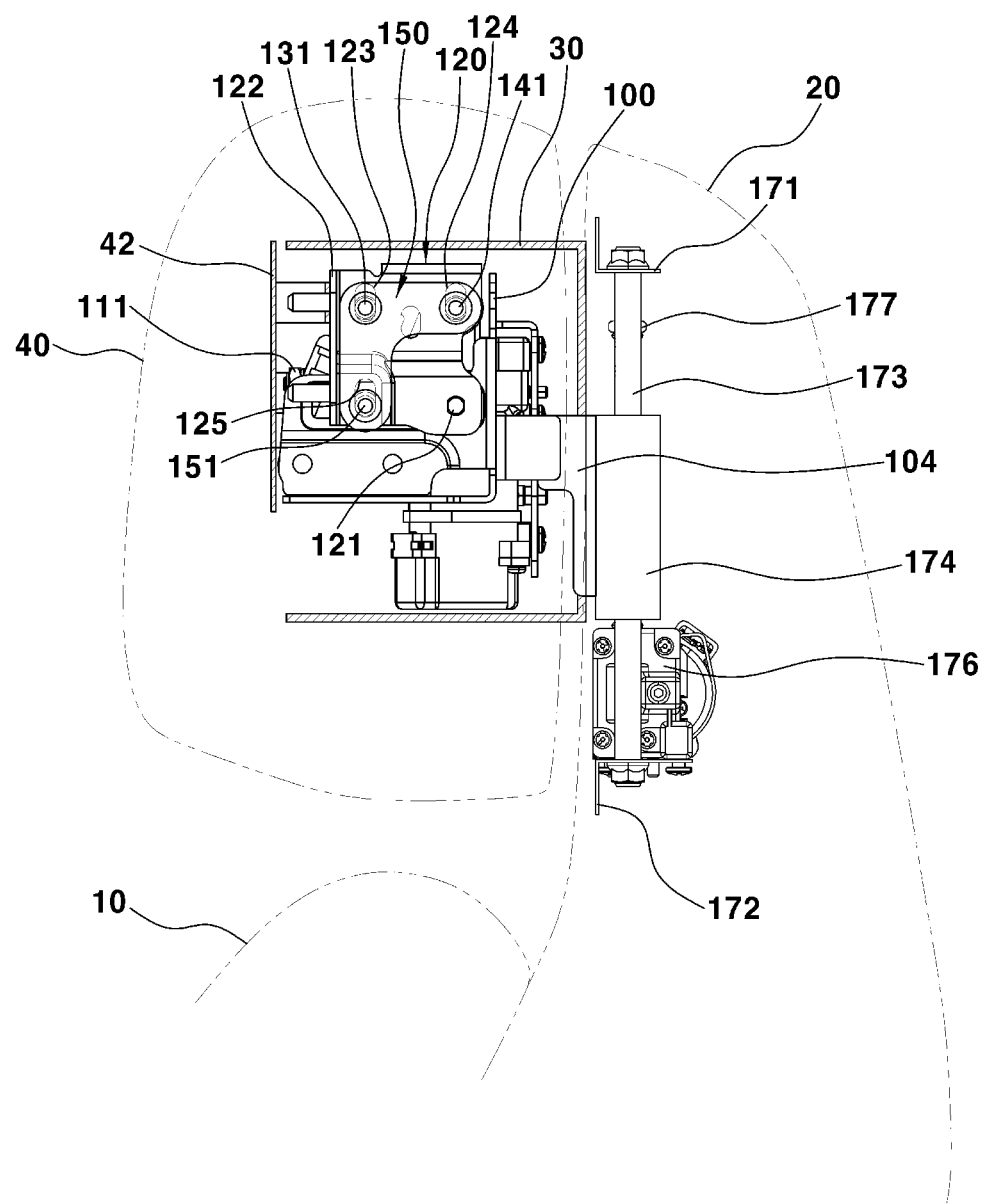
Figure 6:
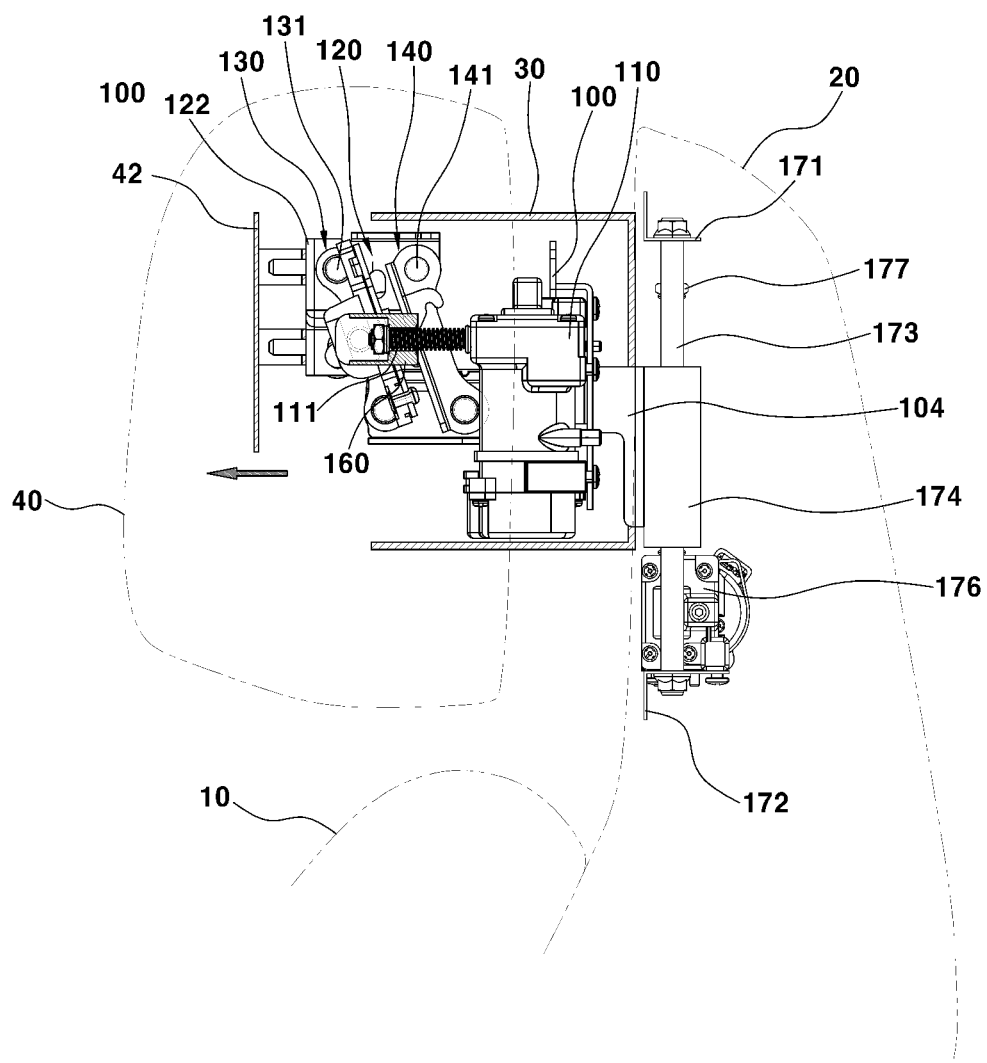
FIG. 6 and FIG. 7 are cross-sectional views illustrating a state in which the headrest is moved forward and is positioned at the frontmost position by the headrest position adjustment apparatus for the vehicle according to the present disclosure.
Figure 7:
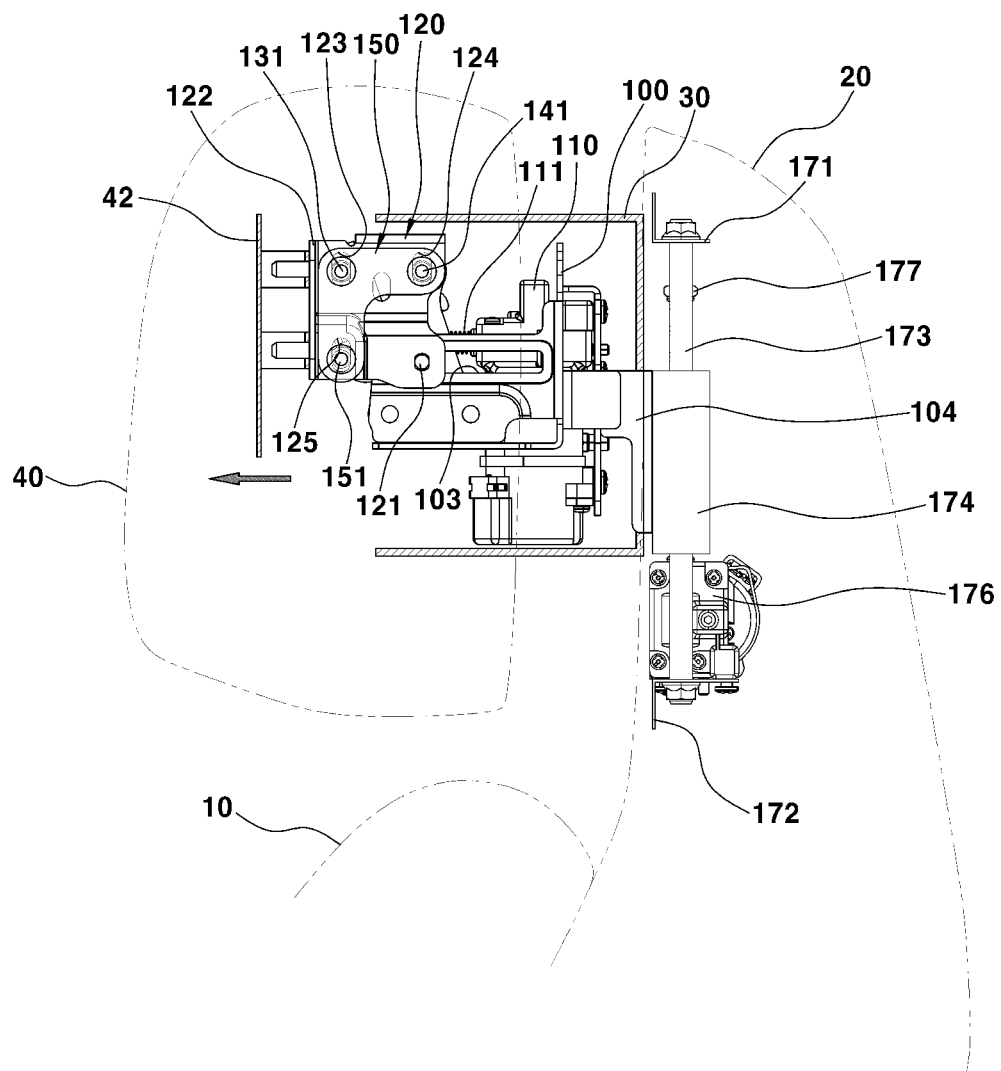

FIG. 4 and FIG. 5 are cross-sectional views illustrating a state in which the headrest is moved backward and is positioned at the rearmost position by the headrest position adjustment apparatus for the vehicle according to the present disclosure, and FIG. 6 and FIG. 7 are cross-sectional views illustrating a state in which the headrest is moved forward and is positioned at the frontmost position by the headrest position adjustment apparatus for the vehicle according to the present disclosure.

Referring to FIG. 4 and FIG. 5, in a state in which the headrest 40 is positioned at the rearmost position, the slider 160 is positioned at the rearmost position along the first lead screw 111, the front link 130 and the rear link 140 are arranged in a state in which the front link 130 and the rear link 140 are inclined backward, and the side bracket 120 is also in a state in which the side bracket 120 is positioned at the rearmost position.

As described above, in order to move the headrest 40 forward while the headrest 40 is positioned at the rearmost position, when the first motor 110 is rotated in the first direction, the first lead screw 111 is rotated in place in the first direction.

Subsequently, the slider 160 is moved forward along the first lead screw 111, and the slider 160 pushes the front link 130.

At this time, when the slider 160 is moved forward along the first lead screw 111, the slider 160 is capable of being moved forward in the passage holes 132 and 142 formed in the front link 130 and the rear link 140 without interference.

Subsequently, as the slider 160 pushes the front link 130 forward, the upper end portion of the front link 130 may be rotated forward around the hinge-fastening points (the points where the lower end portion of the opposite sides of the front link 130 are hinge-fastened to the lower position of each side plate 102 of the fixing bracket 100).

At this time, since the front pin 131 fastened to the upper end portion of the opposite sides of the front link 130 is capable of being swayed in the first slot 123 of the side bracket 120 in the up and down directions, the upper end portion of the front link 130 may be easily rotated forward.

At the same time, since the front link 130 and the rear link 140 are in a state in which the front link 130 and the rear link 140 are connected by the link connector 150 such that the front link 130 and the rear link 140 are capable of being rotated simultaneously, the upper end portion of the rear link 140 may be rotated forward around the hinge-fastening points (the points where the lower end portion of the opposite sides of the rear link 140 are hinge-fastened to the lower position of each side plate 102 of the fixing bracket 100).

At this time, since the rear pin 141 fastened to the upper end portion of the opposite sides of the rear link 140 is capable of being swayed in the second slot 124 of the side bracket 120 in the up and down directions, the upper end portion of the rear link 140 may be easily rotated forward.

In addition, when the front link 130 and the rear link 140 are simultaneously rotated forward or backward, the front pin 131 of the front link 130 and the rear pin 141 of the rear link 140 that are respectively inserted into the first slot 123 and the second slot 124 of the side bracket 120 push the side bracket 120 forward, so that the slide pin 121 of the side bracket 120 may be rectilinearly moved forward along the slide hole 103 of the fixing frame 100. Accordingly, the side bracket 120 may be rectilinearly moved forward.

Therefore, when the side bracket 120 is moved forward, the push-pull plate 122 formed as an integral part of the front end portion of the side bracket 120 pushes the headrest 40 forward, so that the position of the headrest 40 may be moved forward and adjusted.

As described above, when the headrest 40 is moved forward and is positioned at the frontmost position, the slider 160 is positioned at the frontmost position along the first lead screw 111 as illustrated in FIG. 6 and FIG. 7, the front link 130 and the rear link 140 are arranged such that the front link 130 and the rear link 140 are inclined forward, and the side bracket 120 is also most forward position along the first lead screw 111, the front link 130 and the rear link 140 are arranged in a state that is inclined toward the front, and the side bracket 120 is also in a state in which the side bracket 120 is positioned at the frontmost position.

On the other hand, when the first motor 110 is rotated in the second direction, the first lead screw 111 is rotated in place in the second direction, the slider 160 is moved backward along the first lead screw 111, and the slider 160 pulls the front link 130.

Subsequently, as the slider 160 pulls the front link 130 backward, the upper end portion of the front link 130 may be rotated backward around the hinge-fastening points (the points where the lower end portion of the opposite sides of the front link 130 are hinge-fastened to the lower position of each side plate 102 of the fixing bracket 100).

At the same time, since the front link 130 and the rear link 140 are in a state in which the front link 130 and the rear link 140 are connected by the link connector 150 such that the front link 130 and the rear link 140 are capable of being rotated simultaneously, the upper end portion of the rear link 140 may also be rotated backward around the hinge-fastening points (the points where the lower end portion of the opposite sides of the rear link 140 are hinge-fastened to the lower position of each side plate 102 of the fixing bracket 100).

At this time, when the front link 130 and the rear link 140 are rotated simultaneously backward, the front pin 131 of the front link 130 and the rear pin 141 of the rear link 140 that are respectively inserted into the first slot 123 and the second slot 124 of the side bracket 120 pull the side bracket 120 backward, so that the slide pin 121 of the side bracket 120 may be rectilinearly moved backward along the slide hole 103 of the fixing frame 100. Accordingly, the side bracket 120 may be rectilinearly moved backward.

Therefore, when the side bracket 120 is moved backward, the push-pull plate 122 formed as an integral part of the front end portion of the side bracket 120 pulls the headrest 40 backward, so that the position of the headrest 40 may be moved backward and adjusted.

As such, even if the high-back board that is arranged such that the high-back board is positioned higher than the height of the seatback is mounted on the rear surface portion of the seatback so as to improve the seat design and to increase the aesthetic appearance of the seat, the forward and backward position adjustment of the headrest may be easily performed.

Figure 8:
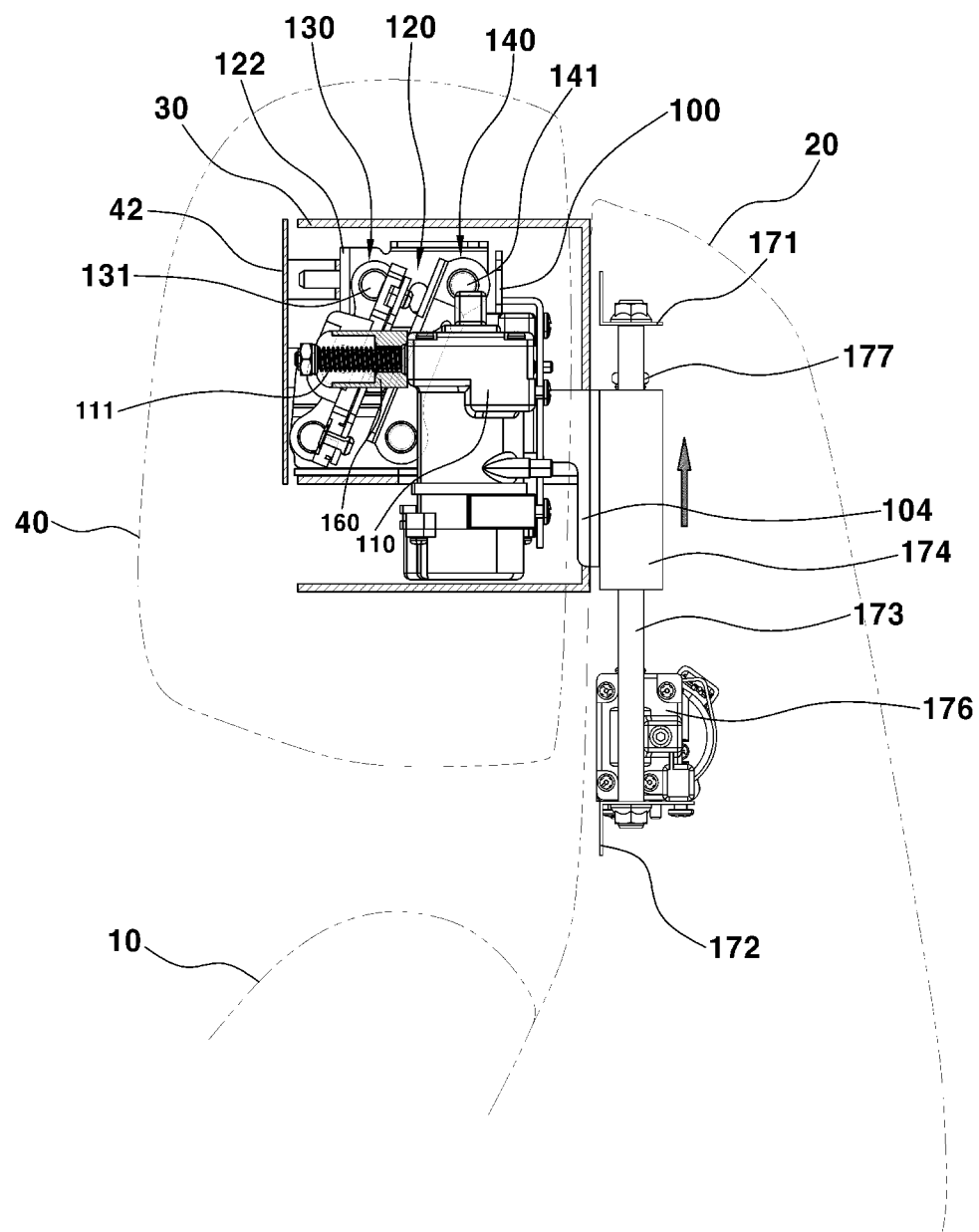
FIG. 8 is a cross-sectional view illustrating a state in which the headrest is positioned at the maximum height by being lifted by the headrest position adjustment apparatus for the vehicle according to the present disclosure.

FIG. 8 is a cross-sectional view illustrating a state in which the headrest is positioned at the maximum height by being lifted by the headrest position adjustment apparatus for the vehicle according to the present disclosure.

According to the present disclosure, the height of the headrest in the up and down directions may be easily adjusted by driving the headrest height adjustment apparatus 170.

To this end, when the second motor 176 is driven first, the second lead screw 177 that is an output shaft of the second motor 176 is rotated in place in the first direction.

Then, as the arm screw body 175 formed on the rear surface portion of the lifting plate 174 is lifted upward along the second lead screw 177, the lifting plate 174 is rectilinearly moved upward.

Of course, when the lifting plate 174 is moved upward, the lifting plate 174 may be rectilinearly moved upward easily by being guided by the pair of guide pipes 173.

At this time, since the connection bracket 104 is in a state in which the connection bracket 104 is fastened to the lifting plate 174 and the connection bracket 104 is in a state in which the connection bracket 104 is fastened to the fixing bracket 100 inside the housing 30, the connection bracket 104 and the fixing bracket 100 are also capable of being moved upward when the lifting plate 174 is moved upward.

Therefore, when the lifting plate 174 is moved upward, the housing 30 having the fixing bracket 100 mounted therein and the headrest 40 mounted on the housing 30 such that the headrest 40 is capable of being slidably moved in the front and rear directions are moved upward, so that the height adjustment of the headrest 40 is capable of being performed.

Of course, when the second motor 176 is driven and the second lead screw 177 that is the output shaft of the second motor 176 is rotated in place in the second direction, the lifting plate 174 is moved downward, so that the position of the headrest 40 may be moved downward and adjusted.

As such, even if the high-back board that is arranged such that the high-back board is positioned higher than the height of the seatback is mounted on the rear surface portion of the seatback so as to improve the seat design and to increase the aesthetic appearance of the seat, the forward and backward position adjustment and also the vertical position adjustment of the headrest may be easily performed.

Although an embodiment of the present disclosure has been described in detail, the scope of the prevent disclosure is not limited to the embodiment, and various modifications and improvements devised by those skilled in the art using the fundamental concept of the present disclosure, which is defined by the appended claims, may further fall within the scope of the present disclosure.

What is claimed is:

1. A headrest position adjustment apparatus comprising:
   a housing mountable on a front surface portion of a high-back board;
   a headrest mountable on the housing such that the headrest is capable of being slidably moved forward and backward;
   a fixing frame comprising slide holes located in opposite side portions of the fixing frame, the fixing frame being mounted inside the housing;
   a first motor mounted on the fixing frame, the first motor having a first lead screw facing forward as an output shaft;
   side brackets, each of the side brackets disposed on a respective opposite side portion of the fixing frame and connectable to the headrest, wherein each side bracket is fastened to a respective slide hole such that the side brackets are capable of being moved forward and backward;
   a front link having a lower end portion and an upper end portion, wherein the lower end portion is hinge-fastened to opposite sides of the fixing frame, and wherein the upper end portion is fastened to a respective front end portion of a respective side bracket such that the front link is capable of being rotated forward and backward;

a rear link having a lower end portion and an upper end portion, wherein the lower end portion is hinge-fastened to the fixing frame, and wherein the upper end portion is fastened to a respective rear end portion of the respective side bracket such that the rear link is capable of being rotated forward and backward; and a slider fastened to the first lead screw such that the slider is capable of being moved forward and backward, wherein the slider has a front end portion connected to the front link.

2. The headrest position adjustment apparatus of claim 1, wherein each front end portion of the side bracket comprises a push-pull plate connectable to the headrest, and wherein the push-pull plate is bent.

3. The headrest position adjustment apparatus of claim 1, further comprising slide pins, wherein each slide pin is inserted into a respective slide hole of the fixing frame such that the slide pin is capable of being moved forward and backward, wherein each slide pin is fastened to a lower position of a respective rear end portion of the respective side bracket.

4. The headrest position adjustment apparatus of claim 1, wherein each side bracket comprises a first slot into which a respective front pin fastened to the upper end portion of the front link is inserted such that the respective front pin is capable of being moved upward and downward.

5. The headrest position adjustment apparatus of claim 4, further comprising link connectors, each link connector disposed on respective side portions of the respective side bracket, wherein each link connector is configured to prevent separation of the respective front pin and the respective rear pin.

6. The headrest position adjustment apparatus of claim 5, further comprising:

lower pins, each lower pin inserted into and fastened to a lower portion of each link connector, and third slots, each third slot into which the respective lower pin is inserted such that the lower pin is capable of being moved upward and downward, wherein each third slot is arranged on a lower position of the respective front end portion of the respective side bracket.

7. The headrest position adjustment apparatus of claim 4, wherein each side bracket comprises a second slot into which a respective rear pin fastened to the upper end portion of the rear link is inserted such that the respective rear pin is capable of being moved upward and downward.

8. The headrest position adjustment apparatus of claim 7, further comprising link connectors, each link connector disposed on respective side portions of the respective side bracket, wherein each link connector is configured to prevent separation of the respective front pin and the respective rear pin.

9. The headrest position adjustment apparatus of claim 8, further comprising:

respective lower pins, each lower pin inserted into and fastened to a lower portion of each link connector, and third slots, each third slot into which the respective lower pin is inserted such that the lower pin is capable of being moved upward and downward, wherein each third slot is arranged on a lower position of the respective front end portion of the respective side bracket.

10. The headrest position adjustment apparatus of claim 1, wherein the front link comprises a passage hole for the slider so that the slider is movable forward and backward along the first lead screw.

11. The headrest position adjustment apparatus of claim 10, wherein the slider comprises a body portion having an arm screw that is fastened to the first lead screw such that the arm screw is capable of being moved forward and backward.

12. The headrest position adjustment apparatus of claim 11, wherein the slider comprises guide pins, each guide pin located on a respective side portion of the body portion and fastened to the front link such that each guide pin is capable of being moved upward and downward.

13. The headrest position adjustment apparatus of claim 12, wherein the front link comprises guide grooves in which the guide pins of the slider are inserted so that the guide pins are capable of being moved upward and downward.

14. The headrest position adjustment apparatus of claim 1, wherein the fixing frame comprises a rear surface portion of a vertical plate, wherein a connection bracket is mounted on the rear surface portion, and wherein the connection bracket is connectable to a headrest height adjustment apparatus that is mounted inside the high-back board.

15. The headrest position adjustment apparatus of claim 14, wherein the headrest height adjustment apparatus comprises:

an upper bracket and a lower bracket mounted inside the high-back board, a pair of guide pipes connected between the upper bracket and the lower bracket, a lifting plate fastened to the connection bracket and also fastened to the guide pipes such that the lifting plate is capable of being lifted, and a second motor mounted on the lower bracket so as to drive the lifting plate.

16. The headrest position adjustment apparatus of claim 15, wherein an arm screw body is formed on a rear surface portion of the lifting plate, and wherein a second lead screw fastened to the arm screw body is mounted on an output portion of the second motor such that the second lead screw faces upward.

17. A headrest position adjustment apparatus comprising:

a fixing frame comprising slide holes located in opposite side portions of the fixing frame;

a first motor mounted on the fixing frame, the first motor having a first lead screw facing forward;

side brackets, each of the side brackets disposed on a respective opposite side portion of the fixing frame and connectable to a headrest, wherein each side bracket is fastened to a respective slide hole such that each side bracket is capable of being moved forward and backward;

a front link having a lower end portion and an upper end portion, wherein the lower end portion is hinge-fastened to opposite sides of the fixing frame, and wherein the upper end portion is fastened to front end portions of the side brackets such that the front link is capable of being rotated forward and backward;

a rear link having a lower end portion and an upper end portion, wherein the lower end portion is hinge-fastened to the fixing frame, and wherein the upper end portion is fastened to rear end portions of the side brackets such that the rear link is capable of being rotated forward and backward; and a slider fastened to the first lead screw such that the slider is capable of being moved forward and backward, wherein the slider has a front end portion connected to the front link.

18. The headrest position adjustment apparatus of claim 17, wherein the slider comprises a body portion having an arm screw that is fastened to the first lead screw such that the arm screw is capable of being moved forward and backward.

19. The headrest position adjustment apparatus of claim 17, wherein the fixing frame comprises a rear surface portion of a vertical plate, wherein a connection bracket is mounted on the rear surface portion, and wherein the connection bracket is connectable to a headrest height adjustment apparatus.

20. The headrest position adjustment apparatus of claim 14, wherein the headrest height adjustment apparatus comprises:
- an upper bracket and a lower bracket,
- a pair of guide pipes connected between the upper bracket and the lower bracket,
- a lifting plate fastened to the connection bracket and also fastened to the guide pipes such that the lifting plate is capable of being lifted, and
- a second motor mounted on the lower bracket configured to drive the lifting plate.

* * * * *